(12) United States Patent
Vokey

(10) Patent No.: US 6,462,923 B1
(45) Date of Patent: *Oct. 8, 2002

(54) COAXIAL CABLE PROTECTION DEVICE

(75) Inventor: David E. Vokey, Bellingham, WA (US)

(73) Assignee: Broadband Telecommunications, L.L.C., Conover, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,764

(22) Filed: Jan. 24, 2000

(51) Int. Cl.[7] ................................................. H02H 3/18
(52) U.S. Cl. ........................................................ 361/79
(58) Field of Search .............................. 361/42, 45, 49, 361/79, 107, 225

(56) References Cited

U.S. PATENT DOCUMENTS 5,793,590 A * 8/1998 Vokey et al. ................. 361/79

* cited by examiner

Primary Examiner—Adolf Deneke Berhane
Assistant Examiner—Pia Tibbits
(74) Attorney, Agent, or Firm—Jacobson & Johnson

(57) ABSTRACT

A coaxial drop cable safety device is used for cable television, data and telephony applications. The device is used on buried drop cable where 60 Hz powering voltages applied to the drop cable exceed low voltage safety limits and where the drop cable is buried at depths which is less than the minimum required to meet electrical safety codes. Tap end and premise end units are connected to the drop cable. The tap end unit applies a DC voltage to the center conductor of the drop cable. A monitoring circuit in the tap end unit monitors the DC current in the center conductor. The tap unit will immediately remove the powering voltage in the event of either an open or faulted condition on the center conductor along the entire length of the drop cable. Additionally, while providing fault protection for the low frequency powering circuit due to tampering or damage to the cable, the fault monitoring circuit allows the high frequency television, data and telephony signals to pass with little or no impediment.

9 Claims, 4 Drawing Sheets

COAXIAL CABLE PROTECTION DEVICE

FIELD OF THE INVENTION

The present invention relates to the protection of conductive cables and more particularly to the protection of cables carrying both signal traffic and AC power.

BACKGROUND

Coaxial cable has been installed extensively by cable television (CATV) operating companies to bring multi-channel wideband television services to homes. These services have provided almost exclusively downstream signal transmission to the customer with little or no upstream or interactive communication from the customer to the head end. With deregulation of the cable television and telephone industries, opportunities exist to provide two way data and telephone services over the cable television coaxial cable network.

To provide new services over the coaxial cable distribution network, power for operating the circuits at the customer end is required. Power could be derived from the electric power system, but this has the disadvantage of connection to mains power and the need for a backup battery in case of power failure. It is therefore preferable to power the home equipment independently from the drop cable to the house.

As the majority of homes in suburban areas have a coaxial service cable already provided it is economically preferable to use the existing drop to also provide the home circuit powering. It has been determined that the power supplied over the coaxial cable should be in the at voltage levels of 90 V AC or more to ensure adequate powering over a typical CATV distribution system. A this voltage level, electrical codes require that a buried service entrance cable be buried at a depth of 18 inches or more to limit exposure to hazardous voltages. A significant portion of the buried CATV coaxial cable drop cables are buried at depths less than the minimum requirement.

A ground fault protection device is required to ensure safe operation without having to replace the existing drop cable. This poses a unique problem as the outer conductor of the coaxial cable is normally grounded and there is no simple means to distinguish between a power load from the center conductor to ground and an unintended fault to ground along the drop cable.

One solution to this problem is disclosed in the applicant's prior U.S. Pat. No. 5,793,590, the disclosure of which is incorporated herein by reference. That patent discloses a coaxial drop cable safety system in which tap end and premise end units are connected to the drop cable. The tap end unit applies a DC voltage to the center conductor of the drop cable. A monitoring circuit in the tap end unit monitors the center conductor DC voltage to a fault from the center conductor to ground along the drop cable. The tap unit will immediately remove the powering voltage In the event of either an open or faulted condition on the center conductor along the entire length of the drop cable.

In the prior art system, each of the tap end and premise end units includes a DC blocking capacitor in the AC conducting path. These must be of sufficiently large value that the AC impedance is low. This will keep the AC voltage drop across the capacitors small so as not to reduce significantly the supplied AC powering voltage at the premise end.

With this system, in order to detect a resistive fault to ground, the voltage to ground must fall to a determined minimum trip level. The DC blocking capacitors must discharge through a fault resistor before the trip level can be reached and the disconnect activated. The larger the value of the capacitors, the longer it will take to discharge them and drop the DC voltage to the trip level.

This may be a problem with an application requiring the powering of a Multiple Distribution Unit where several telephones and other powered devices are connected to a single drop. In this case, the DC blocking capacitor must be of a larger value than is required for a single distribution unit. The requisite large capacitors must discharge through the fault resistance. For fault resistances in the order of 20 to 30 thousand ohms, it can take one half second or more to discharge the capacitors to the trip level for the monitoring circuit.

The present invention addresses the question of providing a shorter disconnect time.

SUMMARY

According to the present invention there is provided a cable protection system for a cable having first and second conductors for carrying an electric signal and AC power from a source to a destination, the system comprising:

a first circuit component for passing the signal to the first conductor;

a second circuit component with an active state for passing the AC power to the first conductor and a blocking state for selectively blocking the passage of the AC power to the first conductor;

monitoring means including:
  means for applying a DC reference voltage to the first conductor; and
  means for monitoring DC current in the first conductor; and actuation means for actuating the second circuit component to the blocking state in response to detection by the monitoring means of a value of said DC current representing a faulted condition of the first conductor.

The system thus removes the powering voltage In the event of a faulted condition on the first conductor, which with a coaxial drop cable will be the center conductor. The actuation to a blocked state is based on a rapid current change rather than a change of voltage that will be delayed by the discharge of large blocking capacitors. The preferred system has a range or "window" of acceptable DC current levels. Currents outside the window, either above or below the acceptable range, trigger the blocking state.

The monitoring means may include means for applying a DC voltage to a resistive circuit including resistances at opposite ends of the center conductor. This establishes the reference DC current in the center conductor. Variations from this reference value indicate a faulted or open circuit condition of the conductor. The DC circuit is limited to the drop cable by the blocking capacitors so that the system can distinguish between a normal end located load and a fault from the center conductor to ground along the drop cable.

BRIEF DESCRIPTION OF THE DRAWINGS

In the accompanying drawings, which illustrate an exemplary embodiment of the present invention.

DETAILED DESCRIPTION

Figure 1:
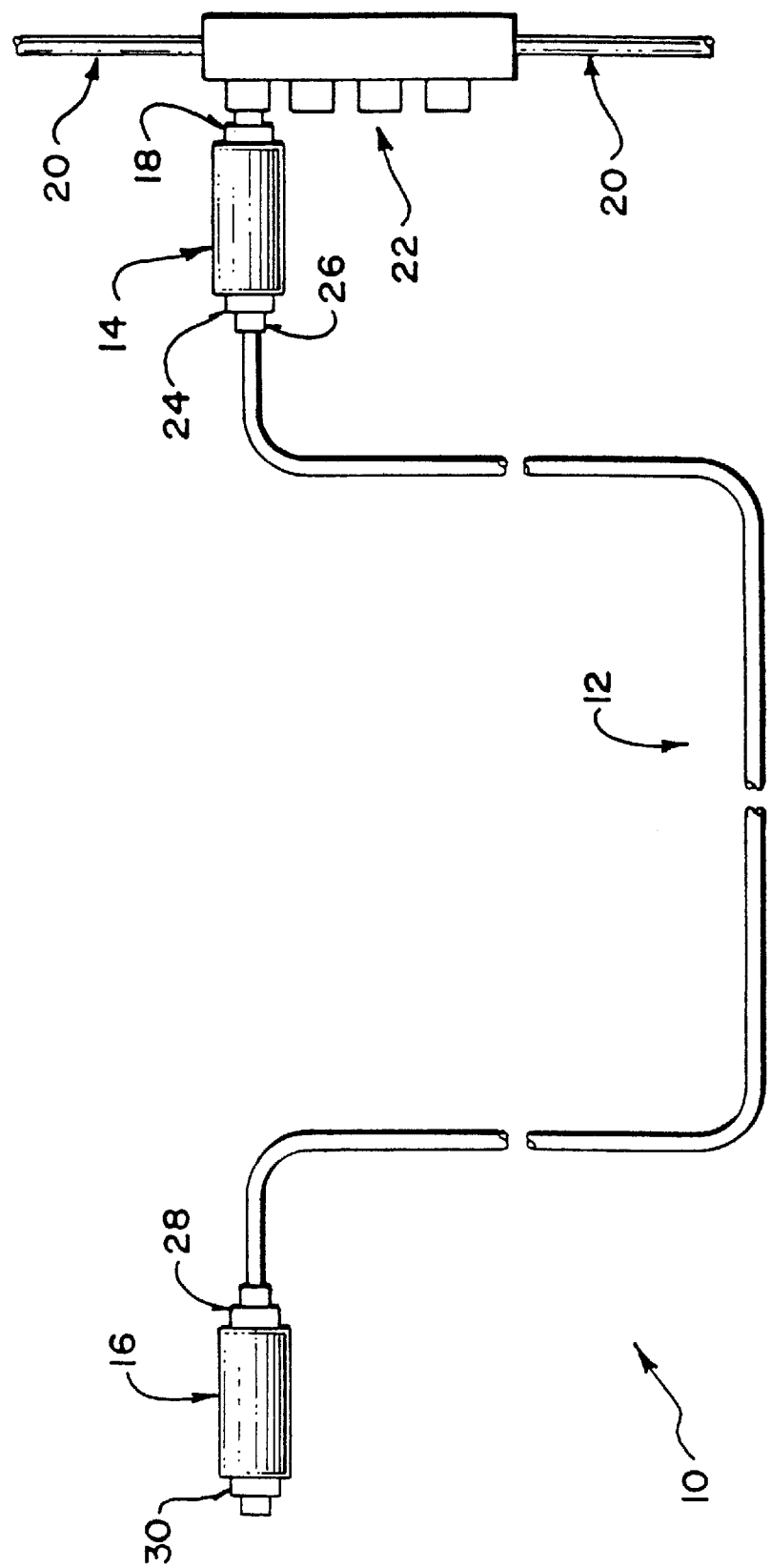
FIG. 1 is an illustration of a system according to the present invention.

Referring to the drawings, and especially FIG. 1, there is illustrated a coaxial drop cable safety system 10 for cable television, data and telephony applications. The system is used on a buried drop cable 12 where 60 Hz powering voltages applied to the drop cable exceed low voltage safety limits and where the drop cable is buried at depths which is less than the minimum required to meet electrical safety codes.

The system is housed in two separate units, a tap unit 14 and a premise unit 16. The tap unit has an input 18 connected to a main distribution cable 20 at a tap 22. The output of the tap unit is connected via a coaxial cable connector 24 to the coaxial drop cable 12. At the opposite end of the drop cable, the premise unit 16 has an input 28 connected to the drop cable and an output 30 for connection to the premise equipment (not illustrated).

Figure 2:
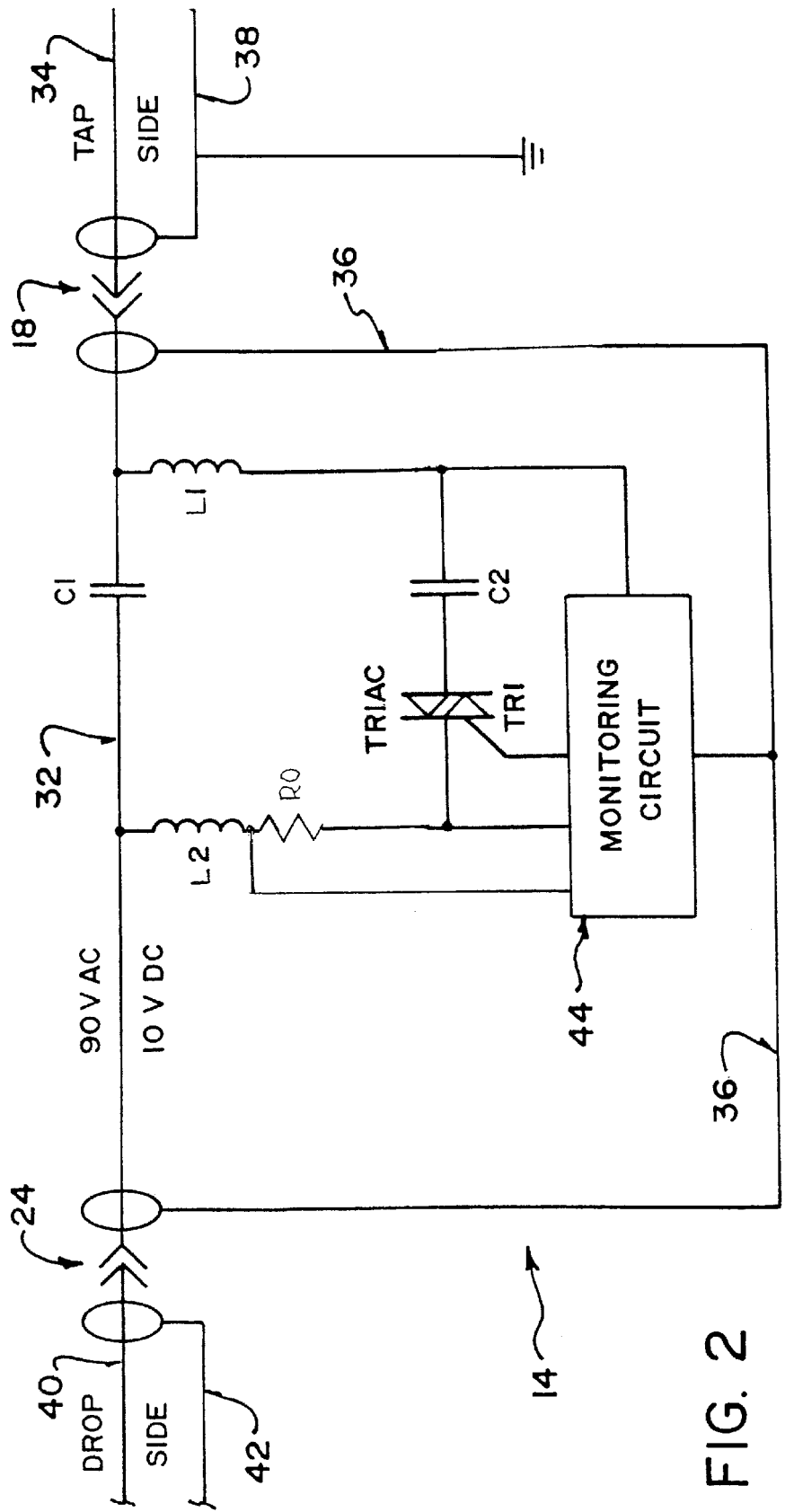
FIG. 2 is a generalized schematic of a tap unit circuit.

Referring to the tap unit basic circuit in FIG. 2, this includes a center conductor 32 connected by input 18 to the signal and AC power carrying conductor 34 of the tap. An outer conductor 36 is connected to a grounded outer conductor 38. At the output 24, the center conductor 32 and the outer conductor 36 are connected to the center conductor 40 and the outer conductor 42 respectively of the drop cable 12. A radio frequency (RF) coupling capacitor C1 is connected in center conductor 32. Between input 18 and capacitor C1, the center conductor is connected to an RF coil L1 which is in turn connected to a capacitor C2 for AC power coupling and DC blocking, and to a monitoring circuit 44. The other side of capacitor C2 is connected through a triac TR1, a sensing resistor R0 and a second RF coil L2 to the center conductor 32 between the output 24 and capacitor C1. The monitoring circuit 44 is connected across the sensing resistor R0 and to the trigger of triac TR1.

The premise unit circuit 16 includes a center conductor 46 connected by input 28 to the center conductor 40 of drop cable 12. An outer conductor 48 is connected to the outer conductor 42 of cable 12. The center and outer conductors 46 and 48 are connected to the output 30. An RF coupling capacitor C9 is connected in center conductor 46. Between input 28 and capacitor C2, the center conductor is connected to an RF coil L3 which is in turn connected to a capacitor C10 for AC power coupling and DC blocking, and a resistor R25. The other side of capacitor C10 is connected through a second RF coil L4 to the center conductor 46 between the output 30 and capacitor C9.

The operation of the circuits is as follows:

The AC power and RF signals are applied to the input connector 18 at the tap side.

The RF signal is applied to the center conductor via coupling capacitor C1.

The AC power is applied to one side of C2 and to the monitoring circuit via coil L1.

The monitoring circuit develops a DC supply voltage which is applied to the inner conductor 32 of the drop cable through R0 and L2.

The termination resistor R25 at the premise end circuit forms one part of a voltage divider which places a reference voltage $V_{DC}$ on the center conductor. This produces a nominal monitoring current $V_{DC}/R25$ which is detected by the monitoring circuit.

With no fault to ground from the center conductor, the monitoring circuit applies a triggering signal to the triac which conducts, connecting capacitor C2 in parallel with capacitor C1 in the center conductor path. The AC power current is passed through L1, C2 and L2 thereby applying AC power to the drop cable.

A fault from the center conductor to ground will result in an instantaneous DC current of $V_{DC}/Rf$ to ground where Rf is the fault resistance. As capacitors C2 and C10 are substantially the same value, the instantaneous fault current through R0 will be approximately $\frac{1}{2}V_{DC}/Rf$.

The monitoring circuit input is connected across R0 and detects the voltage drop ($\frac{1}{2}V_{DC}/Rf$) R0, which is directly proportional to the instantaneous current through R0. The triggering signal to the triac is turned off, which opens the powering circuit.

The value of R0 is selected such that the AC voltage drop is negligible. The DC gain of the monitoring circuit is chosen to provide sufficient amplification and detection of the instantaneous and steady state fault currents.

This provides rapid fault detection and AC power disconnect on the order of a few milliseconds.

In the case of an open circuit due to a break in the cable or tampering, the nominal monitoring current $V_{DC}/R25$ will fall with a proportional decrease in the DC voltage drop across R0. When the voltage across R0 drops below a lower limit, the monitoring circuit removes the triggering signal thereby turning off the triac which opens the powering circuit.

Figure 3:
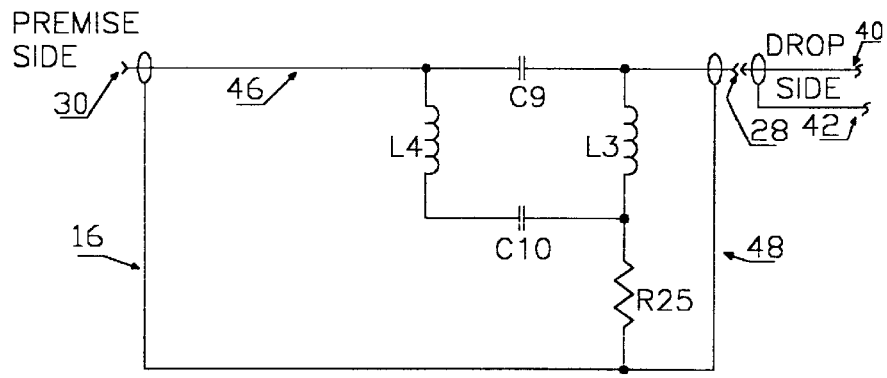
FIG. 3 is a generalized schematic of a premise unit circuit.

With more specific reference to the basic circuit in FIG. 3, the operation of the premise unit circuit is as follows:

The DC monitoring, 90 V AC powering and RF signals are applied to the input connector at the drop cable side.

The RF signal is passed through via coupling capacitor C9.

The 90 V AC power is passed through L3, C10 and L4. and applied to the premise side connector 30.

As discussed above, the termination resistor R25 from the junction of L3 and C10 to the outer conductor forms one part of a voltage divider circuit which is powered by the monitoring circuit to maintain a nominal monitoring current $V_{DC}/R25$ in the center conductor 40 of the drop cable 12.

Figure 4:
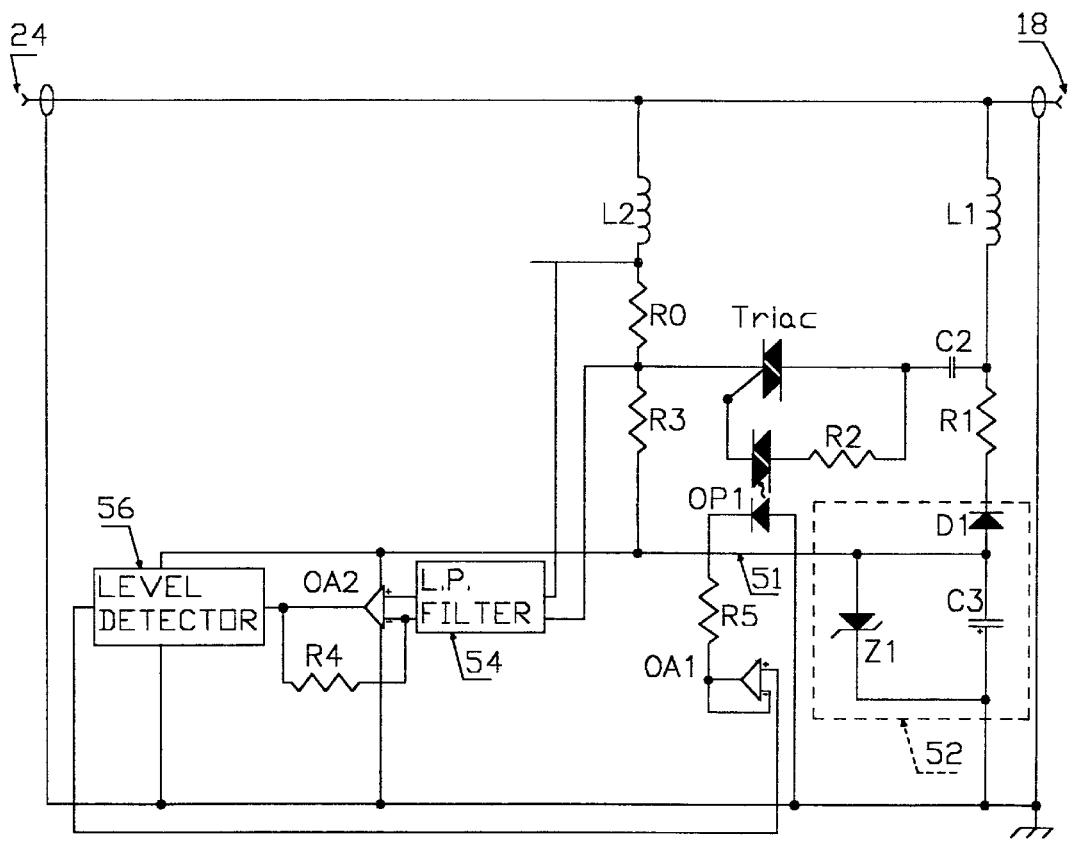
FIG. 4 is a detailed schematic of the tap unit circuit.

FIG. 4 illustrates a detailed schematic of the tap unit. The input 18 is connected to the tap 22 on the distribution cable 20 (FIG. 1). The RF signal is coupled through coupling capacitor C1 to the output connector 24. The 60 Hz power current passes through L1 to the junction of capacitor C2 and a resistor R1. Diode D1 is connected in series with R1. This rectifies the powering voltage which is applied to a zener Z1 and a capacitor C3, which are connected in parallel to form a regulated negative voltage DC power supply 52. The power supply is limited to the zener clamping voltage. The DC supply voltage is applied to a conductor 51. From conductor 51, the supply voltage is applied to the inner conductor 32 through the series combination of a resistor R3, resistor R0 and inductance coil L2. R0 is selected to be less than one ohm in value. The DC supply voltage is also connected to the op amps OA1 and OA2 to power the monitoring circuits.

At the premise end, resistor R25, which is of equal value to resistor R3, shunts the center conductor to ground thereby forming voltage divider with R3 and R0. For a no fault condition the voltage divider produces a center conductor to ground DC reference voltage $V_{DC}$ equal to one half of the DC supply voltage.

A passive low pass filter 54 has its inputs connected to the junction of coil L2 and resistor R0 and to the junction of resistors R0 and R3. The filter removes the 60 Hz power voltage allowing only the DC monitoring voltage to reach the summing inputs to amplifier OA2. This amplifier amplifies the small DC voltage across R0 to a useful value. The gain of the amplifier OA2 is determined by resistor R4. The output of amplifier OA2 is connected to the input of a level detector circuit 56 which is designed to sense a high current limit in a resistive fault condition and a low current limit in an open circuit condition. The output of the level detector 56 is applied to the positive summing input of an amplifier OA1. The output of amplifier OA1 is applied to the input diode of an optical coupler OP1 through resistor R5.

In normal, non-faulted operation, a nominal DC current of $V_{DC}$/R25 is detected through R0. The output of the level detector is in the high state and coupler OP1 is ON causing the triac to trigger, which applies the 60 Hz powering voltage to the center conductor. A resistive fault to ground from the center conductor with a resistance low enough to exceed the maximum current level through R0 will cause the level detector to switch to a low state, which in turn causes OA1 to go low, shutting off OP1. The triggering to the triac is turned of and the triac stops conducting, removing the 60 Hz power from the center conductor. This action happens almost instantly as the discharge of C2 through R0 is detected immediately.

The same shut-off procedure will occur if the center conductor is opened or the premise unit is disconnected. An open circuit to the premise unit will cause the current through R0 to decrease below the minimum set value, which in turn causes the level detector to go low, shutting off the triac and removing the power from the center conductor.

The system thus monitors the drop cable, between the tap unit 14 and the premise unit 16 and removes AC power from the cable whenever an electrical fault occurs in the cable. At the same time, RF signals will continue to be passed through to the premise end of the system.

Figure 5:
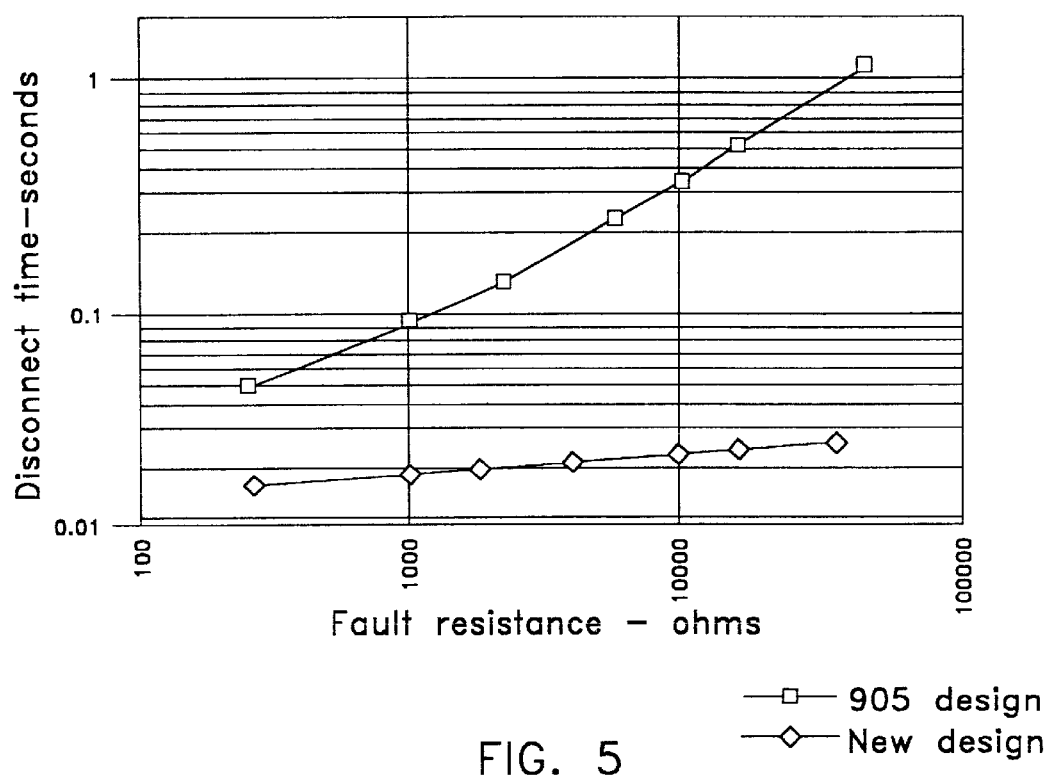
FIG. 5 is a graphic comparison of the disconnect time versus fault resistance characteristics of the prior system and the present system.

The relative speed of the disconnect compared to the prior system is illustrated in the graph of FIG. 5. The prior system disconnect time relates to a system using DC blocking capacitors suitable for a single distribution unit. Substituting the larger capacitors allowed by the present invention in that prior system would significantly increase the disconnect time. As can be seen, for a fault resistance of about 20,000 ohms, the prior system disconnects the power in about one half second, while the present system produces disconnect in just over 20 milliseconds.

While one particular embodiment of the invention is described in the foregoing, this is by way of example only and is not to be construed as limiting. The invention is to be considered as limited solely by the scope of the appended claims.

What is claimed is:

1. A cable protection system for a cable having first and second conductors for carrying an electric signal and an AC power voltage from a source to a destination, the system comprising:

a first circuit component for passing the signal to the first conductor;

a second circuit component with an active state from applying the AC power voltage to the first conductor and a blocking state for blocking the application of the AC power voltage to the first conductor;

monitoring means including:
   means for applying a DC reference voltage to the first conductor; and
   means for monitoring the DC current in the first conductor; and actuation means for actuating the second circuit component to the blocking state in response to detection by the monitoring means of a value of said DC current representing a faulted condition of the first conductor.

2. A cable protection system according to claim 1 wherein the monitoring means comprise an open fault detector for detecting a value of said current less than a minimum limit.

3. A cable protection system according to claim 1 wherein the monitoring means comprise a resistive fault detector for detecting a value of said current greater than a maximum limit.

4. A cable protection system according to claim 3 wherein the monitoring means comprise an open fault detector for detecting a value of said current less than a minimum limit.

5. A cable protection system according to claim 4 wherein the cable is a coaxial cable, the first conductor is a center conductor of the cable, the second conductor is an outer conductor of the cable, and the outer conductor is grounded.

6. A cable protection system according to claim 5 including a tap unit coupled to an input end of the cable and a premise unit coupled to an opposite output end of the cable, the tap unit including the first and second circuit components.

7. A cable protection system according to claim 6 wherein the monitoring means comprise a DC voltage regulator in the tap unit, a resistive circuit with a first part in the tap unit coupled between the voltage regulator and the first conductor, and a second part in the premise unit coupled between the first conductor and the second conductor, and a current monitor monitoring DC current in the first part of the resistive circuit.

8. A cable protection system according to claim 7 wherein the voltage regulator produces a regulated DC supply voltage, the resistive circuit applies a reference voltage that is a predetermined fraction of the supply voltage to the first conductor and the resistive fault detector comprises means for detecting an actual DC current in the first conductor greater than a predetermined maximum allowable DC current.

9. A cable protection system according to claim 8 wherein the open circuit fault detector comprises means for detecting an actual DC current in the first conductor less than a predetermined minimum current.

\* \* \* \* \*